E. L. Walker.
Hay-Fork.
No. 77,134.      Patented Apr. 21, 1868.
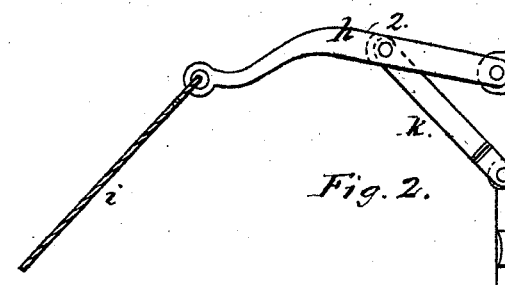
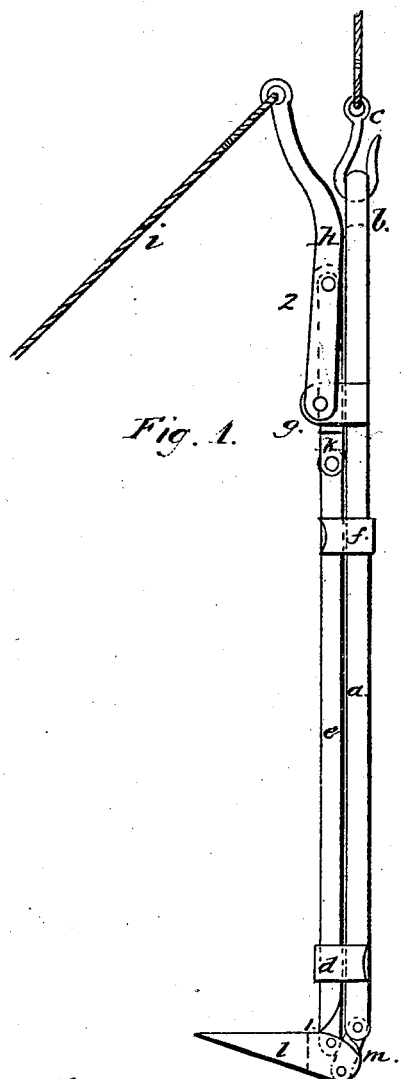
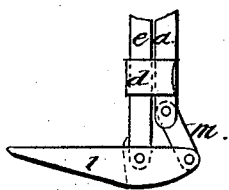
Witnesses:
Geo. D. Walker
Chas. H. Smith
Inventor:
Edw. L. Walker

United States Patent Office.

EDWARD L. WALKER, OF BENFORD'S STORE, PENNSYLVANIA.

Letters Patent No. 77,134, dated April 21, 1868.

IMPROVEMENT IN HORSE HAY-FORKS

*The Schedule referred to in these Letters Patent and making part of the same.*

TO ALL WHOM IT MAY CONCERN:

Be it known that I, EDWARD L. WALKER, of Benford's Store, in the county of Somerset, and State of Pennsylvania, have invented, made, and applied to use a certain new and useful Improvement in Hay-Elevating Forks; and I do hereby declare the following to be a full, clear, and exact description of the same, reference being had to the annexed drawing, making part of this specification, wherein—

Figure 1 is a side elevation of the said fork in the position for raising the hay.

Figure 2 is the same fork, as in position after the hay has been discharged, and the fork is ready for use again, and Figure 3 is a sectional plan below the line $x\ x$, fig. 2.

Figure 4 represents a modification in the joints of the prong.

Similar marks of reference denote the same parts.

The nature of my said invention consists in a perforating and turning-up prong, that supports the hay through which the fork is thrust, and which allows the hay to discharge when the said prong is liberated or turned down.

In the drawing, $a$ is a bar, with an eye, $b$, on its upper end, receiving the hook $c$, or other device by which the fork is raised or actuated.

$e$ is a second bar or slide, connected to the bar $a$ by the clips or straps $d$ and $f$, the parts, however, being free, so that end-motion can be given to the slide $e$.

$g$ is a joint, formed by ears on the bar $a$, receiving the ends of the forked lever $h$, within the fork of which is a link, $k$. The upper end of this link is jointed at $d$ to said lever $h$, and at the other end to the upper end of the bar $e$.

$l$ is the prong, attached by the joint 1 to the lower end of $e$, and by the link $m$ to the lower end of $a$.

It will now be seen that the fork, when in the position shown in fig. 2, can be thrust into the hay, and then the lever $h$ drawn up against the bar $a$, which turns up the prong $l$ below the hay to be lifted, and said prong $l$ cannot be turned down by any weight placed upon it, because the joint 2 passes nearer to the bar $a$ than the joint on the ears $g$.

The rope $i$, at the end of the lever $h$, is employed to discharge the hay, by bringing said lever and parts into the position shown in fig. 2.

If desired, the position of the joint 1 and the joints of the link $m$ might be varied to the form shown in fig. 4, or said prong might be operated within side flanges or a pointed case.

What I claim, and desire to secure by Letters Patent, is—

1. A prong at the lower end of a hay-elevating fork, in combination with the sliding bar $e$, or equivalent mechanism, that acts to turn said prong up below the hay, substantially as set forth.

2. I claim the link $k$ and lever $h$, in combination with the bars $e$ and $a$, and prong $l$, substantially as specified.

In witness whereof, I have hereunto set my signature, this sixteenth day of November, A. D. 1865.

EDW'D L. WALKER.

Witnesses:
GEO. D. WALKER,
CHAS. H. SMITH.